(12) United States Patent
Reynolds et al.

(10) Patent No.: US 12,277,545 B2
(45) Date of Patent: Apr. 15, 2025

(54) TECHNIQUES TO GENERATE AND STORE CHARACTERISTICS OF A SIGNATURE ON A TRANSACTION CARD CIRCUIT

(71) Applicant: Capital One Services, LLC, McLean, VA (US)

(72) Inventors: Anthony Reynolds, Richmond, VA (US); Eric K. Barnum, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 225 days.

(21) Appl. No.: 17/718,614

(22) Filed: Apr. 12, 2022

(65) Prior Publication Data
US 2022/0237588 A1     Jul. 28, 2022

Related U.S. Application Data

(63) Continuation of application No. 16/787,165, filed on Feb. 11, 2020, now Pat. No. 11,328,285.

(51) Int. Cl.
*G06Q 20/34* (2012.01)
*G06Q 20/40* (2012.01)

(52) U.S. Cl.
CPC ....... *G06Q 20/341* (2013.01); *G06Q 20/4012* (2013.01)

(58) Field of Classification Search
None
See application file for complete search history.

(56) References Cited

U.S. PATENT DOCUMENTS

| | | | |
|---|---|---|---|
| 2006/0000897 A1* | 1/2006 | Bonalle | G06Q 20/341 235/382 |
| 2016/0226865 A1* | 8/2016 | Chen | H04W 12/068 |
| 2017/0154328 A1* | 6/2017 | Zarakas | G06Q 20/204 |
| 2018/0150823 A1* | 5/2018 | Omojola | B41J 3/00 |

OTHER PUBLICATIONS

H. Vats, R. Ruhl and S. Aghili, "Fingerprint security for protecting EMV payment cards," 2015 10th International Conference for Internet Technology and Secured Transactions (ICITST), 2015, pp. 95-101, doi: 10.1109/ICITST.2015.7412065. (Year: 2015).*

* cited by examiner

*Primary Examiner* — Gregory S Cunningham, II
(74) *Attorney, Agent, or Firm* — KDW Firm PLLC

(57) ABSTRACT

Various embodiments are generally directed to techniques to perform transaction with transaction cards utilizing characteristics of customer's signature. Techniques may further include determining characteristics of a signature including a reduced set of data points for the signature and storing the characteristics in secure memory of transaction card.

13 Claims, 10 Drawing Sheets

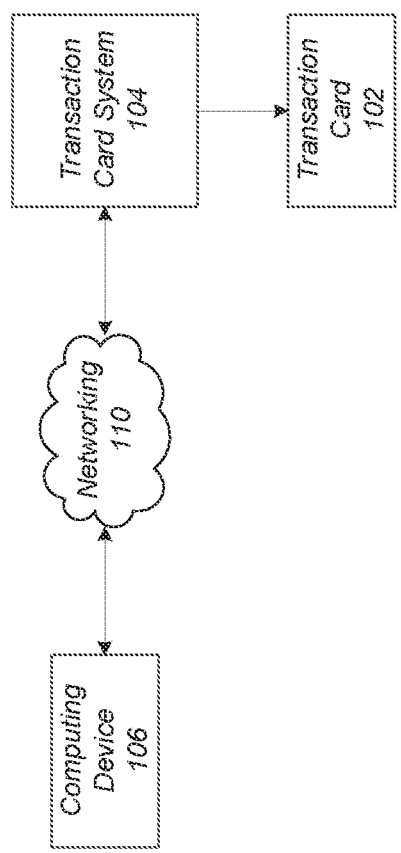

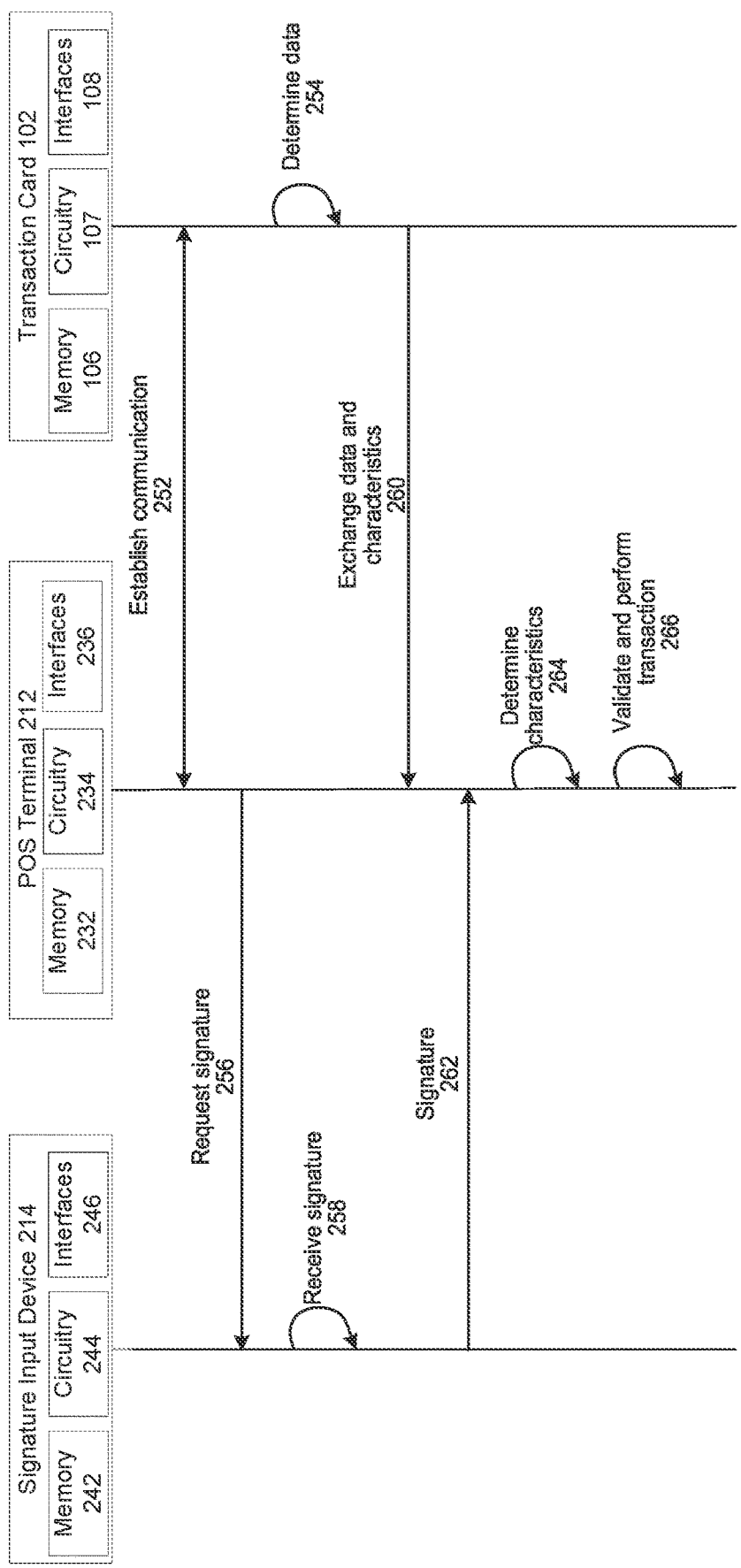

600

```
DETECT A TRANSACTION CARD COUPLED WITH AN
INTERFACE TO PERFORM A TRANSACTION
605
```

```
RECEIVE A FIRST SET OF CHARACTERISTICS OF A
SIGNATURE FROM THE TRANSACTION CARD
610
```

```
RECEIVE A SIGNATURE ENTRY TO PERFORM VALIDATION
FOR THE TRANSACTION
615
```

```
DETERMINE A SECOND SET OF CHARACTERISTICS BASED
ON THE SIGNATURE ENTRY RECEIVED VIA THE ANOTHER
INTERFACE
620
```

```
VALIDATE THE TRANSACTION BASED ON THE FIRST SET OF
CHARACTERISTICS OF THE SIGNATURE ENTRY MATCHING
THE SECOND SET CHARACTERISTICS OF THE SIGNATURE
ENTRY, AND PERFORM THE TRANSACTION
625
```

FIG. 6

TECHNIQUES TO GENERATE AND STORE CHARACTERISTICS OF A SIGNATURE ON A TRANSACTION CARD CIRCUIT

RELATED APPLICATIONS

This application is a continuation application of U.S. patent application Ser. No. 16/787,165, filed Feb. 11, 2020, titled "TECHNIQUES TO GENERATE AND STORE CHARACTERISTICS OF A SIGNATURE ON A TRANSACTION CARD CIRCUIT". The contents of the aforementioned applications are incorporated herein by reference.

BACKGROUND

Today transaction card users can use their cards at merchants across the country and around the world. Card issuers continue to work tirelessly to provide enhancements and new features. These enhancements including constantly developing new security measures to prevent fraud. One previous method including the signature on the back of the transaction card. A cashier or merchant would typically verify the signature against the signature of the customer who signed the receipt. However, this is outdated, too slow, and cashiers rarely ask to see the back of a transaction card anymore. Even when a cashier does look for a signature, they rarely compare it to a signed receipt. Embodiments discussed herein are directed to improving these outdated security measures.

SUMMARY

Embodiments may include systems, devices, and techniques to process transactions in a secure manner. In one example, embodiments include a transaction card including one or more interfaces to couple with point of sale (POS) terminals. The transaction card may further include a memory configured to store characteristics of a signature associated with a banking account, wherein the characteristics comprise a reduced set of data points of the signature, and a processing circuit coupled with the memory and the one or more interfaces. The processing circuit may be configured to detect a POS terminal coupled with an interface of the one or more interfaces to perform a transaction using the banking account, retrieve, from the memory, the characteristics of the signature including the reduced set of data points of the signature, and communicate, via the interface of the one or more interfaces, the characteristics of the signature to the POS terminal.

In another example, embodiments may include a computing device including one or more interfaces, memory to store instructions, and a processor coupled with the memory. The processor may be configured to execute the instructions, that when executed cause the processor to receive and process an electronic representation of a signature from a computing device, apply an algorithm to the received electronic representation of the signature to generate characteristics of the signature, wherein the characteristics comprise a reduced number of data points from the received electronic representation of the signature. the processor may determine a user account associated with the signature and cause, during an initiation routine of a transaction card, the characteristics of the signature including the reduced number of data points to be written to a secure portion of a memory of the transaction card.

In another example, embodiments may include a point of sale (POS) terminal, including one or more interfaces to couple with transaction cards. The POS terminal also includes a memory to store instructions, and a processing circuit coupled with the memory and the one or more interfaces. The processing circuit may process the instructions to detect a transaction card coupled with an interface of the one or more interfaces to perform a transaction, receive, via the interface, a first set of characteristics of a signature from the transaction card, receive, via another interface, a signature entry to perform validation for the transactio, and determine a second set characteristics of the signature entry. The processing circuit validate the transaction based on the first set of characteristics of the signature entry matching the second set characteristics of the signature entry, and enable performance of the transaction.

BRIEF DESCRIPTION OF THE DRAWINGS

FIG. 1A illustrates an example of a system to initiate a transaction card.

FIG. 2B illustrates an example of a communication flow to perform a transaction using a transaction card.

FIG. 6 illustrates an example of a third flow diagram.

DETAILED DESCRIPTION

Figure 1B:
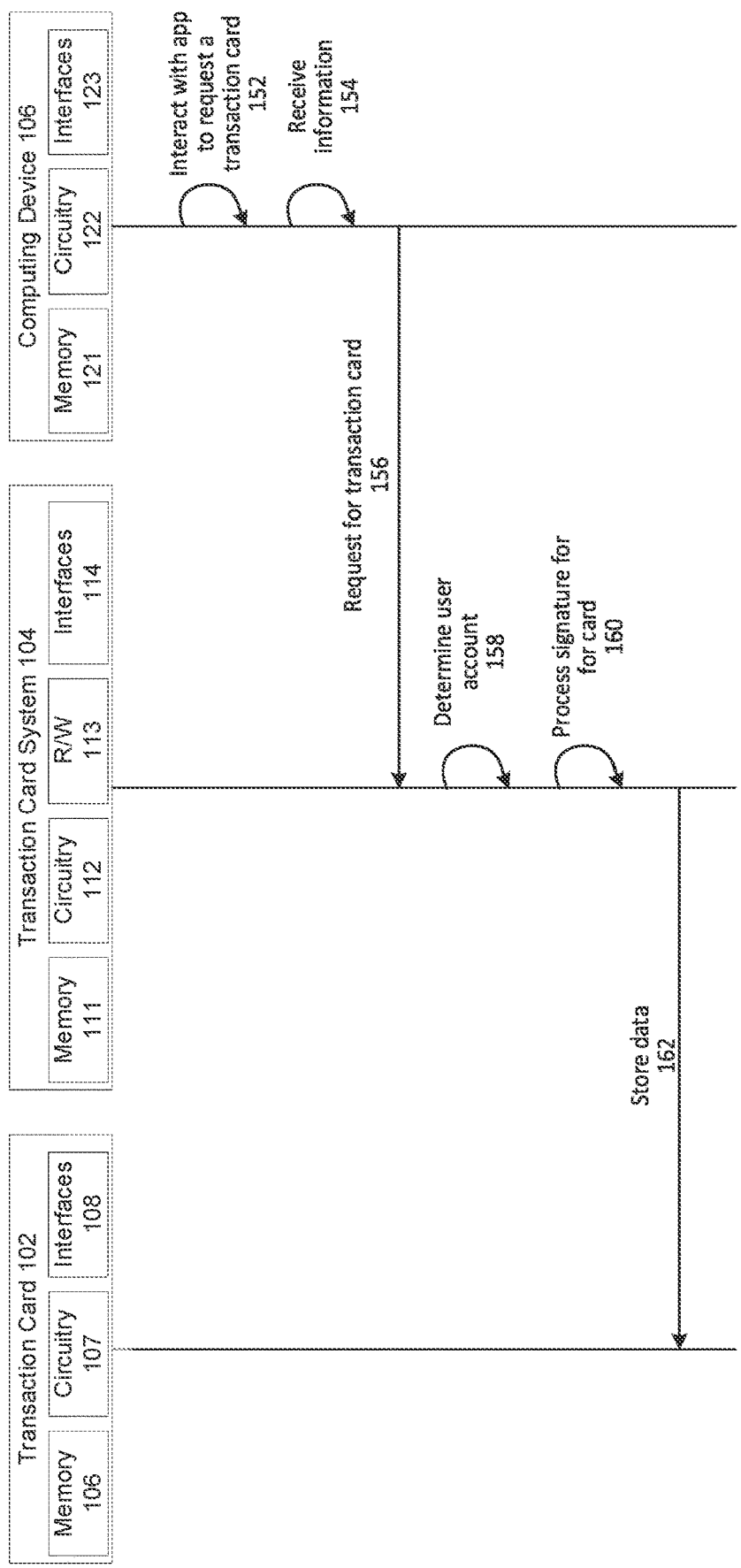
FIG. 1B illustrates an example of a communication flow to initiate a transaction card.

Various embodiments are generally directed to systems, devices, techniques, and so forth to store information and data on transaction cards that may be used to verify a customer during a transaction involving a transaction card and a merchant system. More specifically, embodiments include determining a customer's signature and generating characteristics of the signature to store on circuitry of a transaction card. The characteristics of the signature may include a reduced number of data points from the total number of data points for the signature. For example, an algorithm may be applied to a signature to determine the reduced number of data points while maintaining a target level of precision or accuracy when performing or verifying a transaction.

Embodiments discussed herein provide technical improvements over the current state of the art because it enables transaction card manufacturers to provide an additional level of security, e.g., automatic electronic signature verification, utilizing the current memory sizes of a transaction card or only adding a minimal amount of memory to the transaction cards. Thus, embodiments discussed provide cost-saving technical improvements and are implemented into the practical application of automatic electronic customer verification using a transaction card in a merchant system environment. These and other details will become more apparent in the following description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives within the scope of the claims.

FIG. 1A illustrates an example system 100 to initiate transaction cards for use to perform transactions according to embodiments discussed herein. As further discussed below, system 100 may include transaction card system 104, and a computing device 106. Further, the system 100 may initiate any number of transaction cards, including transaction card 102, as illustrated in FIG. 1A. The components and devices of system 100 may be coupled to communicate with each other via one or more interconnects and/or networks. For example, the computing device 106 may communicate with the transaction card system 104 via networking 110, which may include wired and wireless networking in accordance with one or more standards, Institute of Electrical and Electronics Engineers (IEEE) 802.11, Bluetooth, near-field communication (NFC), etc. The transaction card system 104 may be further configured to communicate with transaction cards to initiate and program them, e.g., via the Europay, Mastercard, and Visa (EMV) protocol, the NFC protocol, the Wireless Fidelity (WiFi) protocols (802.11), Bluetooth protocols, and so forth. However, embodiments are not limited in this manner and may include communicating with devices via other techniques. System 100 illustrates a transaction card 102, which is further explained below with reference to FIGS. 3A-3B.

System 100 includes a transaction card system 104 configured to perform operations to enable users to initialize transaction cards, such as transaction card 102. Specifically, the transaction card system 104 may process a request for the transaction card 102 and initiate it for use by a user. These operations may include determining data relating to the requesting customer, generating a transaction card number, process a customer signature, and writing information to the transaction card 102 to enable it for use.

In embodiments, the transaction card system 104 may include computing devices, servers, processing resources (processor(s) or circuitry), memory resources (memory), storage resources, interfaces, and so forth to process requests and initiate transaction cards. In one example, the transaction card system 104 may receive the request for a transaction card from a computing device 106 over an interface and via networking 110. The transaction card system 104 may include one or more application programming interface(s) (APIs) configured to handle requests received via a user interacting with a website through a web browser. For example, a user utilizing the computing device 106 may access a banking website or a transaction card application website to request a transaction card. The website, based on the user interactions and request, may send information to the transaction card system 104 through one or more API(s) to request a transaction card. The request may be sent securely, using known secure communication techniques. In another example, the transaction card system 104 includes one or more API(s) configured to handle requests from an application (app) executing on the computing device 106, such as a mobile phone device. For example, a mobile phone device may include a banking app and the user may interact with the banking app to request the transaction card. Embodiments are not limited to these examples.

The transaction card system 104 may receive, and the request may include data such as the requesting user's name, address, telephone number, email address, social security number. The request may include additional data such as banking account information to associate the transaction card with a specific account and a personal identification number (PIN) that may be entered by a user to perform a transaction. The request may also include a signature associated with the user and used to identify the user. In embodiments, the request may be communicated to the transaction card system 104 utilizing secure communication techniques and the information may be encrypted to ensure privacy. For example, the transaction card system 104 may communicate data in accordance with the Payment Card Industry (PCI) Data Security Standard (DSS).

In embodiments, the transaction card system 104 may process the data to prepare to write it to the memory of the transaction card 102. For example, the transaction card system 104 may format the data for storage on the transaction card 102, e.g., put the data into a format that may be read by a merchant system. In one example, the transaction card system 104 may format the data in accordance with the International Organization for Standardization (ISO) and International Electrotechnical Commission (IEC) 7813 standard ("the ISO/IEC 7813 standard"). In some instances, the transaction card system 104 may write the data to the memory of the transaction card 102 once it is in the appropriate format. The data written to the transaction card 102 may include an account number, a customer identifier, an expiration date, a customer verification value (CVV), a personal identification number (PIN), and a digital representation of a signature of the customer.

In embodiments, the transaction card 102 may perform one or more operations to reduce the memory footprint of the data stored on the transaction card. 102. Thus, a card producer may reduce the amount of memory required on the card for it to store all of the required data. For example, the transaction card system 104 may receive a digital representation of the signature and process the representation to reduce the size of the signature, e.g., the number of bits of signature. More specifically, the transaction card system 104 may determine a number of particular characteristics of the signature that may be used to verify the customer with a full comparison of signatures. The number of characteristics including the reduced number of data points may be based on a desired accuracy for a processing system and is not limited to a particular amount. Characteristics including more data points may have a higher level of precision than characteristics including less data points for the same given signature. In one example, as the formality of the transaction increases, the system 104 can require more characteristics (finer precision) to authenticate the signature. So, for example, at a gas station, where the transaction care quite small, a lesser precision or number of characteristics may be used. However, in situations where the transaction includes a higher dollar amount, the signature may require more characteristics to authenticate. Another example involving more precision may include signatures used for a notary.

In embodiments, the characteristics determined by the transaction card system 104 may be determined based on the type of signature. In some instances, the digital representation of the signature may be a digital handwritten signature captured by the computing device 106 or another signature capturing device, e.g., signature pad device, a photocopy device, scanner, etc. A user may utilize a finger or stylus to sign their signature on a touchscreen interface integrated into and/or coupled with the computing device 106. In another example, the signature may be handwritten on paper digitized by a scanner or photocopying device coupled with the computing device 106. The computing device 106 may digitize to generate the digital representation of the signature and send it to the transaction card system 104 in a digital signature format.

A digital signature format may include image formats, such as Joint Photographic Experts Group (JPEG), Tagged Image File Format (TIFF), Graphics Interchange Format (GIF), Windows Bitmap (BMP), Portable Network Graphics (PNG), raster format, and so forth. Embodiments are not limited in this manner, and the digital signature format may include other file formats, such as a portable document format (PDF), plaintext format, Hypertext Markup Language (HTML) format, document (doc) format, OpenDocument (odt) format, PostScript (ps) format, Scalable Vector Graphics (SVG) format, and so forth.

In some instances, the digital representation of the signature may be a digital fingerprint captured by a digital fingerprint device integrated and/or coupled with the computing device 106. The transaction card system 104 may receive the digital fingerprint from the computing device 106 in a digital fingerprint format, such as an above-mentioned image format, document format, and/or as specified in the American National Standard for Information Systems Standards (ANSI/NIST-ITL 1-2000). Embodiments are not limited to these examples.

The transaction card system 104, as previously discussed, may apply one or more operations to apply an algorithm to reduce the number of data points of the signature. The algorithm may be a reduction routine or process applied to the signature to generate a reduced number of data points from a total number of data points of the signature. The reduction routine may include determining characteristics of the signature and storing the characteristics of the signature in the memory of the transaction card 102. Thus, the entire signature is not stored in the memory of the transaction card 102, and only the characteristics including the reduced number of data points are stored, significantly reducing the amount of memory usage.

In embodiments, the transaction card system 104 may perform a reduction routine, by analyzing the signature and determining the characteristics of the signature including determining one or more measurements. In one example, the transaction card system 104 may determine the locations of points of each letter of a signature or the digital representation of a signature handwritten. The points may be the peaks (high points) and valleys (low points) for each of the letters and each location for each point may be a coordinate pair (x,y) location. The base or (0,0) location may be the furthest left point and bottom point, respectively, when the signature is orientated from left to right. The transaction card system 104 may determine other measurements include spacing between the letters of the signature, the spacing of the letters of the signature (width of the letters). In some instances, the transaction card system 104 may receive one or more of the measurements from the device capturing the signature, e.g., the computing device 106. For example, the measurements may include a capture time of the signature, a pressure applied to capture of the signature, a degree of inclination of a writing instrument to capture the signature, and so forth. In embodiments, the measurements may be made in units, such as a number of pixels, millimeters (mm), centimeters, inches, or any other unit. The measurements may be the characteristics and the reduced number of data points for the signature and may be stored on the transaction card 102.

In embodiments, the signature may be a fingerprint signature and transaction card system 104 may determine the characteristics of the fingerprint signature. For example, the transaction card system 104 may determine patterns of the fingerprint signature, minutiae features of the fingerprint signature, moisture content of finger, the pressure applied to capture fingerprint signature, or a combination thereof. In embodiments, information describing or measuring the patterns, features, moisture content, pressure, etc. may be the characteristics including the reduced set of data points of the fingerprint signature. Embodiments may further include other biometric features, such as an iris signature, a facial signature, and so forth.

The transaction card system 104 may include one or more components to write the data to the memory of the transaction card 102. For example, the transaction card system 104 may include an EMV writer to couple with the EMV pad of the transaction card 102. The transaction card system 104 may cause the EMV writer to send one or more signals, commands, and data through the EMV pad to write the data to the memory of the transaction card 102. In another example, the transaction card system 104 may include a wireless interface, such as an NFC interface, Bluetooth interface, or WiFi interface and may cause the signals, commands, and data to communicate via the wireless interface to write the data to the memory of the transaction card 104. In another example, the transaction card system 104 may include a mag stripe reader/writer and may write the data to a mag stripe of the transaction card 102. In embodiments, the transaction card system 104 may securely write the data, including the PIN, account number, expiration date, CVV, and characteristics, into one or more secure memory locations using encryption/decryption techniques.

FIG. 1B illustrates an example communication diagram 150 of system 100 to process a request for a transaction card. The illustrated communication diagram 150 includes the transaction card 102, the transaction card system 104, and the computing device 106, which may be coupled via one or more networks as previously discussed. In embodiments, the transaction card 102 may include memory 106, circuitry 107, one or more interfaces 108, and other components (not shown). The transaction card system 104 includes memory 111, circuitry 112, an EMV read/write device 113, one or more interfaces 114, and other components (not shown). Similarly, the computing device includes memory 121, circuitry 122, one or more interfaces 123, and other components (not shown). In embodiments, the components of the transaction card 102, transaction card system 104, and computing device 106 may perform one or more operations and communications discussed herein.

In embodiments, the system 100 may include a computing device 106 that may be any type of device configured to enable a customer to request a new or replacement transaction card. For example, the computing device 106 may be configured with a banking app or a web browser that a customer may interact with to order the transaction card. Examples of a computing device 106 a mobile device, a personal digital assistant (PDA) device, and a personal computer (PC). In embodiments, the computing device 106 may be a network-enabled computer. The computing device 106 may be a mobile device; for example, the mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. However, embodiments are not limited in this manner, the computing device 106 may be another type of device, e.g., a communications device, a handheld PC, a server, a network appliance, a PC, a workstation, a personal digital assistant, a thin client, a fat client, and so forth.

In embodiments, the computing device 106 may include an interface 123, such as touchscreen display capable of displaying data to a user and receiving one or more inputs. For example, the computing device 106 may include one or more apps, such as a banking app or a web browser, that may be presented to the user in a graphical user interface (GUI) displayed on the touchscreen display and the user may interact with the app via the touchscreen interface. In embodiments, the banking app and/or the web browser accessing a banking website may enable the user to perform one or more banking functions, such as checking account balances, paying bills, transferring money, changing settings, and so forth. In some instances, the banking app or banking website enables a user to order or reorder a transaction card, such as a credit card or debit card.

In embodiments, the communication flow 150 may include, at line 152, the computing device 106 receiving one or more inputs, via one or more interfaces 123, to interact with an application to initiate a request for the transaction card 102. For example, the computing device 106 may receive a user selection in a banking app to send a request for a transaction card. In another example, the computing device 106 may receive one or more user selections to navigate to a webpage of a website presented in the web browser to send a request for a transaction card. Embodiments are not limited to these examples.

In some instances, computing device 106 may request additional information from the user for the request for the transaction action card at line 154. For example, the user may be required to enter information, such as the user's name, address, telephone number, email address, social security number, and other personal information. The computing device 106, via the app, may request the user to enter information to establish and/or associate an account with the transaction card, such a specific account number and a PIN that may be entered by a user to perform a transaction.

In embodiments, the computing device 106 may receive a signature from the user to use to identify the user. For example, the user may enter a signature via the touchscreen interface by drawing his/her signature with their finger or a stylus. In another example, the computing device 106 may be coupled with an electronic signature pad configured to receive and digitize a user's signature. The computing device 106 may receive the signature via the signature pad coupled via an interface 123, for example. In another example, the computing device 106 may be coupled with a copy or scanner device configured to scan a user's signature handwritten on a paper. In some instances, the signature may be a user's fingerprint and the computing device 106 may capture the fingerprint via a fingerprint device, the touchscreen interface, or another device coupled with the computing device 106.

In embodiments, the computing device 106 may generate a digital representation of the signature. The digital representation may be based on the interface or device used to capture the signature. For example, if the user signed their signature via the touchscreen interface, a photocopy of a written signature, and so forth the digital representation may be in an image format, such as JPEG, TIFF, GIF, BMP, PNG, raster format, and so forth. Embodiments are not limited in this manner, and the digital signature format may include other file formats, such as PDF, plaintext format, HTML format, Doc format, odt format, ps format, SVG format. In another example, if the user has entered a fingerprint as their signature, the computing device 106 may generate the digital representation in accordance with the American National Standards Institute/National Institute of Standards and Technology (ANSI/NIST) Data Format for Interchange of Fingerprint, Facial, & Scar & Tattoo (SMT) Information. However, embodiments are not limited in this manner.

At line 156, the request may be communicated to the transaction card system 104 utilizing secure communication techniques and the data may be encrypted to ensure privacy. Note that although line 156 is illustrated as a single arrow going in one direction, implementations may include an exchange of information between the computing device 106 and the transaction card system 104 to communicate the request. For example, embodiments may include an exchange of information to set up a secure connection between the system 104 and device 106, authenticate the user of the computing device 106, send the data, and so forth.

As mentioned, the request may include information for a transaction card system 104 to generate the transaction card 102. For example, the request may include the requesting user's name, address, telephone number, email address, social security number, banking account information to associate the transaction card with a specific account, a PIN that may be entered by a user to perform a transaction. The request may also include a signature associated with the user and used to identify the user.

In some instances, the transaction card system 104 may utilize the information in the request to determine additional information relating to the user. For example and at line 158, the transaction card system 104 may lookup a user account for the user based on the information in the request, e.g., a user's name, address, social security number, etc. The transaction card system 104 may perform a lookup in a data store, such as a database, using the information to determine an account and information relating to the user. Embodiments are not limited to this example.

In embodiments, the transaction card system 104 may perform one or more operations to prepare and cause the information to be written to a transaction card 102. For example, the transaction card system 104 may format the data into a format in accordance with a standard, such as the ISO/IEC 7813 standard, to securely write data, including the PIN, account number, expiration date, and CVV, into one or more secure memory locations using encryption/decryption techniques. In embodiments, the transaction card system 104 may also generate characteristics including a reduced data set of the signature and write the characteristics to secure memory of the transaction card 102.

At line 162, the transaction card system 104 may write data to the memory 108 of the transaction card 102. In embodiments, the data may be written in a secure, encrypted manner and may occur in one or more communications with the transaction card 102. In some instances, the transaction card system 104 may write the data to the transaction card 102 utilizing an EMV writer. However, embodiments are not limited to this example. In other instances, the transaction card 102 may communicate data to the transaction card 102 via the Bluetooth protocol, the NFC protocol, the WiFi protocol, and so forth. The transaction card 102 may receive the data and store it one or more secure memory locations. In embodiments, the transaction card 102 may store the data in the memory in accordance with a standard, such as the ISO/IEC 7813 standard.

Figure 2A:
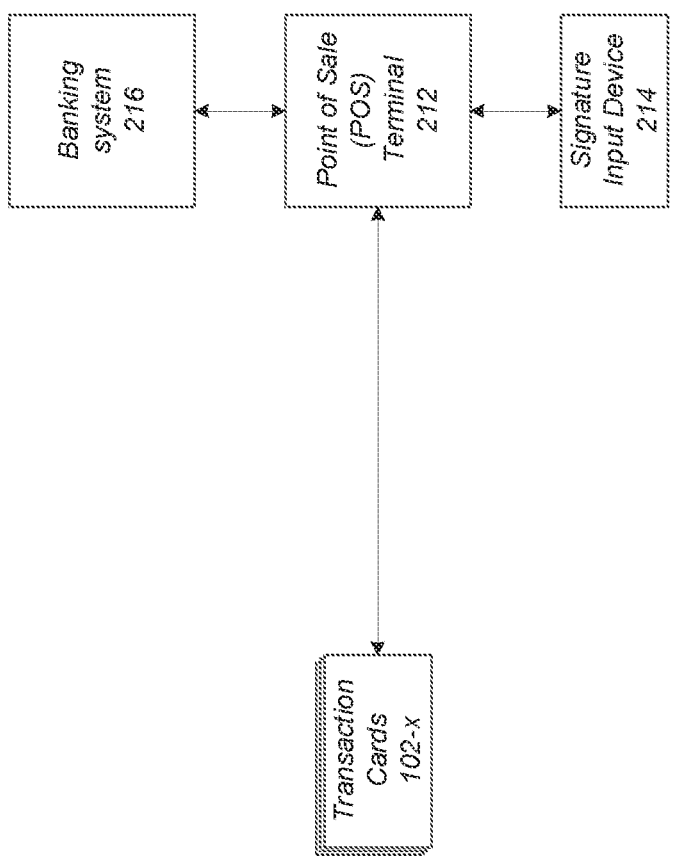
FIG. 2A illustrates an example of a system to perform a transaction using a transaction card.

FIG. 2A illustrates an example system 200 for processing transactions with a transaction card 102 storing data including characteristics of a signature. System 200 may be a point-of-sale (POS) system enabling users to make purchases and perform transactions via transaction cards 102-x, where x may be any integer value. In the illustrated example, system 200 including a POS terminal 212 coupled with a signature input device 214 and a banking system 216. In embodiments, the components of system 200 may communicate with each via one or more wireless and wired networking links, and in accordance with one or more networking standards, e.g., IEEE 802.11, Bluetooth, NFC, etc.

In embodiments, the POS terminal 212 may be any type of POS terminal where a transaction is completed. The POS Terminal 212 is configured to process items, calculate the amount owed by a customer, indicate an amount to the customer, prepare an invoice for the customer (which may be a cash register printout), indicate options for the customer to make a payment, and perform additional operations to complete a transaction. The POS terminal 212 is configured to accept payment in any number of forms of payment methods, e.g., cash, store credit, government assistance stamps, transaction cards, mobile phone devices, etc. In embodiments, the POS terminal 212 is configured to enable the customer to select which method of payment he or she wishes to use, e.g., via a GUI input, button selection, etc. System 200 is configured to process transactions performed via a transaction card 102 storing and providing data and characteristics of a signature to verify a user. However, embodiments are not limited in this manner. For example, embodiments discussed herein may also include a mobile phone device or computing device storing data and characteristics of a signature to perform transactions and the device providing the characteristics and additional information to perform a transaction.

In embodiments, the POS terminal 212 may be coupled with a signature input device 214, which may be a signature pad to capture a signature of a customer. The signature input device 214 may include a liquid crystal display (LCD) touchpad using a pen-type stylus to generate inputs on the touchpad. A user digitally "signs" the LCD touchpad, and a sensor "reads" the pressure from the tip of the stylus, transmitting signature data to the POS Terminal 212. In another example, the signature input device 214 may be a biometric fingerprint reader to capture a fingerprint signature of a customer. Once captured, the POS terminal 212 may convert the signature into a digital signature that may be utilized by the POS terminal 212 to verify a customer.

In embodiments, the POS terminal 212 may also be coupled with a banking system 216. The banking system 216 includes computing devices, such as one or more servers, data stores, and so forth to process and store data to perform transactions. In one specific example, the banking system 216 may be a credit or debit card processing system configured to process real-time credit or debit card transactions. In embodiments, the POS terminal 212 may communicate data including account information, PIN information, etc. to the banking system 216 and the banking system 216 may process the data to enable the performance of a transaction. The banking system 216 may send data back to the POS terminal 212 indicating whether to proceed with a transaction or not, e.g., if the customer cannot be verified, the banking system 216 may notify the POS terminal 212 to cancel or prevent the transaction, and vice versa.

In embodiments, the POS terminal 212 may communicate a signature captured by the signature device 214 to the banking system 216. The banking system 216 may apply an algorithm to determine characteristics of the signature and send the characteristics back to the POS terminal 212 to enable the POS terminal 212 to compare with the characteristics stored on the transaction card 102 and verify the customer. In other instances, the POS terminal 212 may determine the characteristics, locally, by applying an algorithm to the captured signature and verifying the customer.

The banking system 216 may store, in storage, a plurality of signatures associated with a customer and track any changes that may be occurring the customers signature. In some instances, the signature may change over time and may need to be updated. For example, a customer's signature may change over time due to age or disability. In embodiments, the banking system 216 may utilize signatures received from one or more POS terminals to track a customer's signature over time and update characteristics of the signature on a transaction card 102 (or another device) from time-to-time, for example. The banking system 216 may determine an average of characteristics of the signature over a period of time, e.g., since transaction card origination, the previous year, the previous six-months, etc. To determine the average, the banking system 216 may apply an algorithm to generate characteristics including a reduced set of data points and average those characteristics with previously captured signatures and characteristics for the given period of time.

In embodiments, the banking system 216 may apply machine-learning techniques to more accurately update the signature and characteristics over time. For example, the banking system 216 may apply a K-means algorithm to signatures associated with a customer stored in storage when a transaction card and a signature are both used in any digital capture device like and POS machine or similar system to more accurately determine if the signature captured by the device matches a K-means processed group of signatures.

FIG. 2B illustrates an example communication flow 250 that may occur between devices of system 200 to process a transaction. The communication flow 250 includes a transaction card 102 including memory 106, circuitry, and interfaces 108. The communication flow 250 also includes a transaction card 102 as illustrated in FIGS. 1A/1B, a POS terminal 212 including memory 232, circuitry and interfaces 236, and a signature input device 214 including memory 242, circuitry 244, and interfaces 246. Note that the communication flow 250 is illustrated with a limited number of devices and components for descriptive purposes and may include additional devices and components, e.g., networking components, input components, storage components, etc.

In embodiments, a customer may be in the process of performing a transaction to purchase a good or service at a POS terminal 212. The customer may interact with the POS terminal 212 up to the point to provide payment and may select a payment method. In the illustrated example, the transaction is performed with transaction card 102 that may include the exchange of data including includes characteristics of the signature of the customer.

At line 252, the POS terminal 212 may establish a connection with the transaction card 102. In one example, the transaction card 102 may include NFC communication capabilities and include circuitry responsive to NFC communications communicated by the POS terminal 212. The POS terminal 212 and transaction card 102 may exchange data in accordance with the NFC protocol. In another example, the transaction card 102 may be implemented with EMV communication capabilities and include circuitry responsive to EMV communications communicated by the POS terminal 212 coupled with the transaction card 102 via EMV contact pads. In this example, the POS terminal 212 and transaction card 102 may exchange data in accordance with the EMV protocol.

At line 254, the transaction card 102 determines data to communicate to the POS terminal 212 to perform the transaction. The data may include customer identifying information (name), account information, CVV information, expiration date, and characteristics of a signature. The data may be stored in a secure memory of memory 106 and may be retrieved by circuitry 107, for example. In some embodiments, the transaction card 102 may determine the data based on one or more communication exchanges between the transaction card 102 and the POS terminal 212 and in accordance with a communications protocol. For example, the transaction card 102 and POS terminal 212 may be coupled and communicating in accordance with the NFC protocol. The transaction card 102 may receive one or more signals in accordance with the NFC protocol and access the data and characteristics of the signature in secure memory locations to send to the POS terminal 212. In another example, the transaction card 102 and POS 212 may be coupled via contact pads and communicate in accordance with the EMV communication standard. The transaction card 102 may receive one or more signals in accordance with the EMV protocol and access the data and characteristics of the signature in secure memory locations to send to the POS terminal 212.

In some instances, the transaction card 102 may apply one or more processing operations to the data and the characteristics to send it to the POS terminal 212. For example, the transaction card 102 may secure the data and characteristics by applying an encryption technique utilizing a stored secure key of a pairwise key configuration.

The transaction card 102 may also execute a one-way hash function to the data and/or the characteristics to prevent sensitive information from being modified by an attacker. In some instances, the transaction card 102 includes a random number generator to generate a salt value, e.g., a random value, to apply to the data, the characteristics, and/or both prior to performing the one-way hash function. In some instances, the random number generator may be a 'pseudo-random' number generator that may use a seed value. In these instances, the POS terminal 212 may be configured with a 'pseudo-random' number generator and know the seed value such that both the POS terminal 212 and transaction card 102 may generate the same 'random' number. Thus, the POS terminal 212 may apply the same salt value to the characteristics received from the transaction card 102. In other instances, the transaction card 102 may encrypt the salt value and communicate it to the POS terminal 212.

The transaction card 102 may apply the salt value to the characteristics to generate salted characteristics by appending the value to the characteristics, e.g., to the beginning or end of data associated with the characteristics. In other instances, the salt value may be placed within the data, e.g, at a specific point which may only be known to the transaction card 102 and the POS terminal 212. The transaction card 102 may apply a one-way hash function to the salted characteristics to generate a hash value of the salted characteristics. The hash value may be shared with the POS terminal to ensure that the characteristics are authentic. In embodiments, the transaction card 102 may apply salting and hashing techniques to other data, e.g., an account number, a name or identifier, etc. for data integrity.

At line 260, the transaction card 102 may communicate the data and characteristics of the signature to the POS terminal 212. The communication may be in accordance with a standard, such as NFC, EMV, Bluetooth, WiFi, etc. As mentioned, the transaction card 102 may communicate the data and the characteristics in an encrypted format and the hash value generated based on the characteristics with or without a salt value. In some instances, the salt value may also be communicated to the POS terminal 212 by the transaction card 102. In other instances, the transaction card 102 and POS terminal 212 may utilize a seed value, previously discussed, and the salt value may be generated by both the transaction card 102 and the POS terminal 212.

In embodiments, the POS terminal 212 may perform one or more operations to perform the transaction. For example, the POS terminal 212 may prompt the user to enter his or her signature on the signature input device 214 at line 256. The prompt may be presented on a display of the POS terminal 212 and/or the signature input device 214. Other indicators may be utilized. For example, the POS terminal 212 may cause the signature input device 214 to light up and/or cause the device to emit a visual or audio prompt.

At line 258, the signature input device 214 may receive the signature of the customer. And at 262, the signature input device 214 may communicate the captured signature to the POS terminal 212. The signature may be communicated in a digitalized format.

At line 264, the POS terminal 212 may determine the characteristics of the signature captured by the signature input device 214. In embodiments, the POS terminal 212 may apply the same algorithm to the digital representation of the captured signature as used to generate the characteristics to store on the transaction card 102. The algorithm may be used to determine characteristics, such as locations of points of letters of the signature, spacing between the letters of the signature, spacing of the letters of the signature, a capture time of the signature, a pressure applied to capture of the signature, a degree of inclination of a writing instrument to capture the signature, or a combination thereof if the signature is a handwritten signature. In another example, the algorithm may determine characteristics, such as patterns of the fingerprint signature, minutiae features of the fingerprint signature, moisture content of finger, the pressure applied to capture fingerprint signature, or a combination thereof if the signature is a fingerprint signature. In other instances, the POS terminal 212 may communicate the captured signature to a banking system, the banking system may generate the characteristics, and return the characteristics to the POS terminal 212.

At line 264, the POS terminal 212 may perform one or more processes on the data and characteristics received from the transaction card 102. For example, the POS terminal 212 may apply a decryption technique utilizing a key key-combo shared with the transaction card 102. The POS terminal 212 may also verify the integrity of the characteristics, data, or both, by verifying the hash value from the transaction card 102.

In embodiments, the POS terminal 212 may perform one or more verification operations. For example, the POS terminal 212 may verify the signature received by the signature input device 214 against the signature stored on the transaction card 102. More specifically, the POS terminal 212 may determine whether the characteristics of the signature received from device 214 match the characteristics stored and received from the transaction card 102. In some embodiments, the POS terminal 212 may apply the salt value received from the transaction card 102 or generated during the exchange of information to the characteristics of the signature from device 214. The POS terminal 214 may generate another hash value based on the salted characteristics and compare against the hash value generated from the salted characteristics on the transaction card 102. If the hash value match, the POS terminal 212 may validate the signature received from the device 214, for example.

In embodiments, other verification techniques may be utilized. For example, the POS terminal 212 may do a "side-by-side" comparison of the characteristics themselves. In one specific example, if a certain number of points of a handwritten signature match from both signatures (captured by the signature capture device 214 and the transaction card 102), the POS terminal 212 may validate the captured signature. A similar determination may be applied to a fingerprint signature, e.g., a certain number of minutiae points match. The number of points in the handwritten and/or minutiae points may be determined based on the desired level of confidence for the signature. For example, 10 points must match to have 99% confidence that the signature is the same. The number of points may be configurable. Other characteristics may be utilized to validate the customer's signature in a similar manner. In some instances, a combination of characteristics may be used. Embodiments are not limited in this manner.

At line 266, the POS terminal 212 may validate the transaction and cause the performance of the transaction. Validation of the transaction may include ensuring the signatures match and a PIN match a stored PIN on the transaction card 102. For example, in addition to prompting the customer for the signature, the POS terminal 212 may prompt the customer to enter a PIN via a keypad. The POS terminal 212 may receive a stored PIN in data from the transaction card 102 and validate the received PIN if they match. Embodiments are not limited in this manner.

Figure 3A:
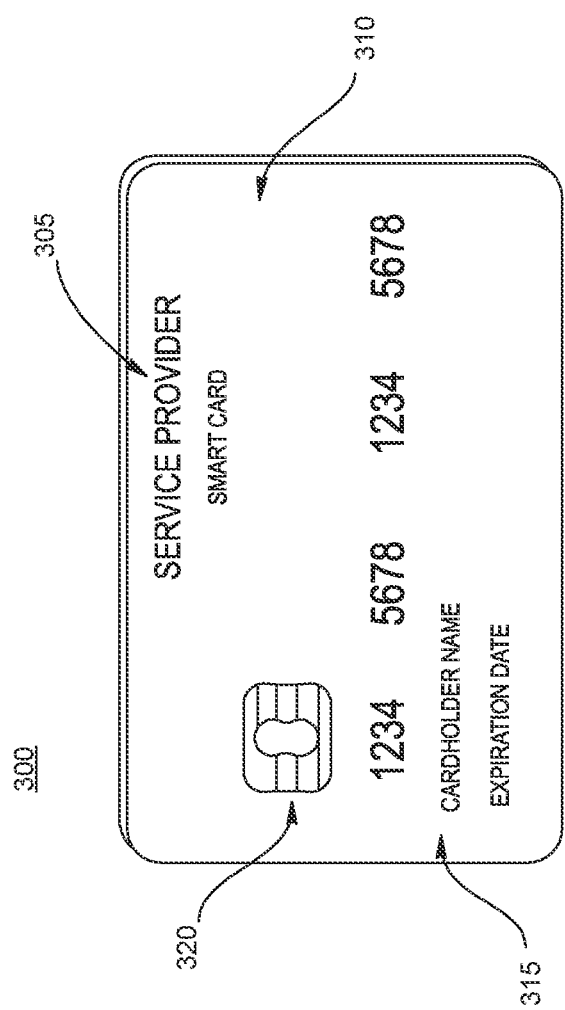
FIG. 3A is an illustration of a transaction card according embodiments.

FIG. 3A illustrates an example configuration of a transaction card 300, which may include a contactless card, a payment card, such as a credit card, debit card, or gift card, issued by a service provider as displayed as service provider indicia 305 on the front or back of the card 300. In some examples, the transaction card 300 is not related to a payment card and may include, without limitation, an identification card. In some examples, the transaction card may include a dual interface contactless payment card, a rewards card, and so forth. The transaction card 300 may include a substrate 310, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the transaction card 300 may have physical characteristics compliant with the ID-1 format of the ISO/IEC 7816 standard, and the transaction card may otherwise be compliant with the ISO/IEC 14443 standard. However, it is understood that the transaction card 300, according to the present disclosure may have different characteristics, and the present disclosure does not require a transaction card to be implemented in a payment card.

The transaction card 300 may also include identification information 315 displayed on the front and/or back of the card, and a contact pad 320. The contact pad 320 may include one or more pads and be configured to establish contact with another client device, such as a POS terminal, a transaction terminal, an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The transaction card 300 may also include processing circuitry, antenna, and other components as will be further discussed in FIG. 3B. These components may be located behind the contact pad 320 or elsewhere on the substrate 310, e.g., within a different layer of the substrate 310. The transaction card 300 may also include a magnetic strip or tape, which may be located on the back of the card (not shown in FIG. 3A). The transaction card 310 may also include an NFC device coupled with an antenna capable of communicating via the NFC protocol. Embodiments are not limited in this manner.

Figure 3B:
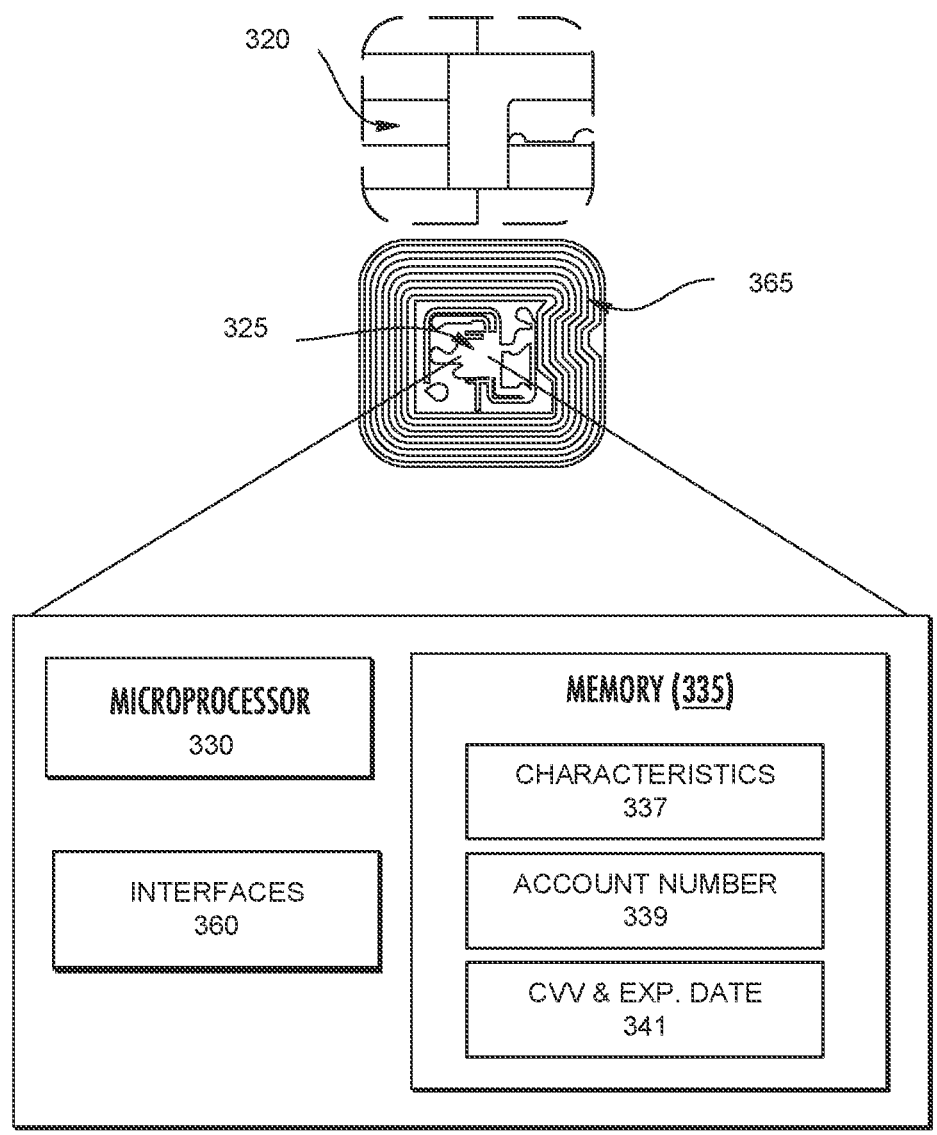
FIG. 3B is an illustration of a processing system of the transaction card according to embodiments.

As illustrated in FIG. 3B, the contact pad 320 may include or be coupled with an integrated chip 325 for storing and processing information, including a microprocessor 330 including processing circuitry (circuitry 107), and memory 335 (memory 106). It is understood that the integrated chip 325 may contain additional components, including processors, memories, error and parity/CRC checkers, data encoders, anticollision algorithms, controllers, command decoders, security primitives, and tamper-proofing hardware, as necessary to perform the functions described herein. Although illustrated as part of or behind the contact pad 320, embodiments are not limited in this manner. In some instances, the integrated may be located in a different location of the transaction card 300 and be coupled with the contact pad 320 via one or more traces or interconnects to enable communication via EMV. Further and although not shown, the integrated chip 325 may be coupled with one or more other interfaces including an NFC interface. Thus, the integrated chip 325 including the components are capable of communicating via the NFC protocol via the NFC interface The memory 335 may be any type of memory including, but not limited to, read-only memory, write-once read-multiple memory or read/write memory, e.g., RAM, ROM, and EEPROM, and the transaction card 300 may include one or more of these memories. In some instances, the transaction card 300 may include more than one type of memory and may include encrypted and unencrypted capable memory. A read-only memory may be factory programmable as read-only or one-time programmable. One-time programmability provides the opportunity to write once then read many times. For example, the data 339 and 341 and the characteristics 337 of a signature of a customer may be written once to the memory 335. A write-once/read-multiple memory may be programmed at a point in time after the memory chip has left the factory. Once the memory is programmed, it may not be rewritten, but it may be read many times. In other instances, the data 339 and 341 and characteristics 337 may be updated from time-to-time and memory 335 may be a read/write memory. A read/write memory may be programmed and re-programmed many times after leaving the factory. It may also be read many times.

The memory 335 may be configured to store data, including one or more characteristics of a signature 337, and data including an account number 339, a CVV and Expiration Date 341. In embodiments, the memory 335 may store additional data, such as keys (public and/or private) to perform encryption, a PIN, name of customer, a customer identifier, etc. In embodiments, the memory 335 may store instructions or any software application operable on the transaction card including the microprocessor 330.

In embodiments, the microprocessor 330 may be any type of processor and include circuitry to process instructions to perform operations discussed herein. In one example, the microprocessor 330 may be a metal-oxide-semiconductor (MOS) integrated circuit chip. The microprocessor 330 may be configured to process instruction stored in memory 335 including operations to store data in memory and perform a transaction. For example, the microprocessor 330 processing the instructions may communicate data in application programming data units (APDUs) with another device, such as a programming device, to receive data and characteristics in the memory 335. Similarly, the microprocessor 330 may communicate data and characteristics in APDUs to a POS terminal to perform a transaction. Operations performed by the microprocessor 330 may include encrypting data using an encryption algorithm such as triple data encryption standard (DES), Rivest-Shamir-Adleman (RSA) encryption, and a Secure Hash Algorithm (SHA). The microprocessor 330 may be further configured to process instructions to generated salt values and hashes of the data and characteristics stored in the memory 335.

In embodiments, the transaction card 300 may also include one or more interfaces 360 including an NFC device. The NFC device may operate passively and may be energized by a signal emitted by an NFC device of the client device, e.g., a POS terminal. The NFC device may draw its power from the electromagnetic field caused by the NFC device of the client device, for example. However, embodiments are not limited in this manner. In another example, the transaction card 300 may be provided with a power source (not shown) operable to supply power to the NFC device such that it can activate its own electromagnetic field. Embodiments are not limited in this manner, and the transaction card 300 may communicate other data with other devices.

In some examples, the transaction card 300 may include one or more antennas 365. The one or more antennas 365 may be placed within the transaction card 300 and around the integrated chip 325 and the contact pad 320. For example, the one or more antennas 365 may be integral with the processing circuitry 325 and the one or more antennas 365 may be used with an external booster coil. As another example, the one or more antennas 365 may be external to the contact pad 320 and the processing circuitry 325. In embodiments, the one or more antennas 365 may be coupled with the NFC device and be configured to enable NFC communication.

In an embodiment, the antenna 3655 including a coil of transaction card 300, may act as the secondary of an air-core transformer. For example, a POS terminal may communicate with the transaction card 300 by cutting power or amplitude modulation. The transaction card 300 may infer the data transmitted from the POS terminal using the gaps in the transaction card's power connection, which may be functionally maintained through one or more capacitors. The transaction card 300 may communicate back by switching a load on the transaction card's coil or load modulation. Load modulation may be detected in the terminal's coil through interference.

Figure 4:
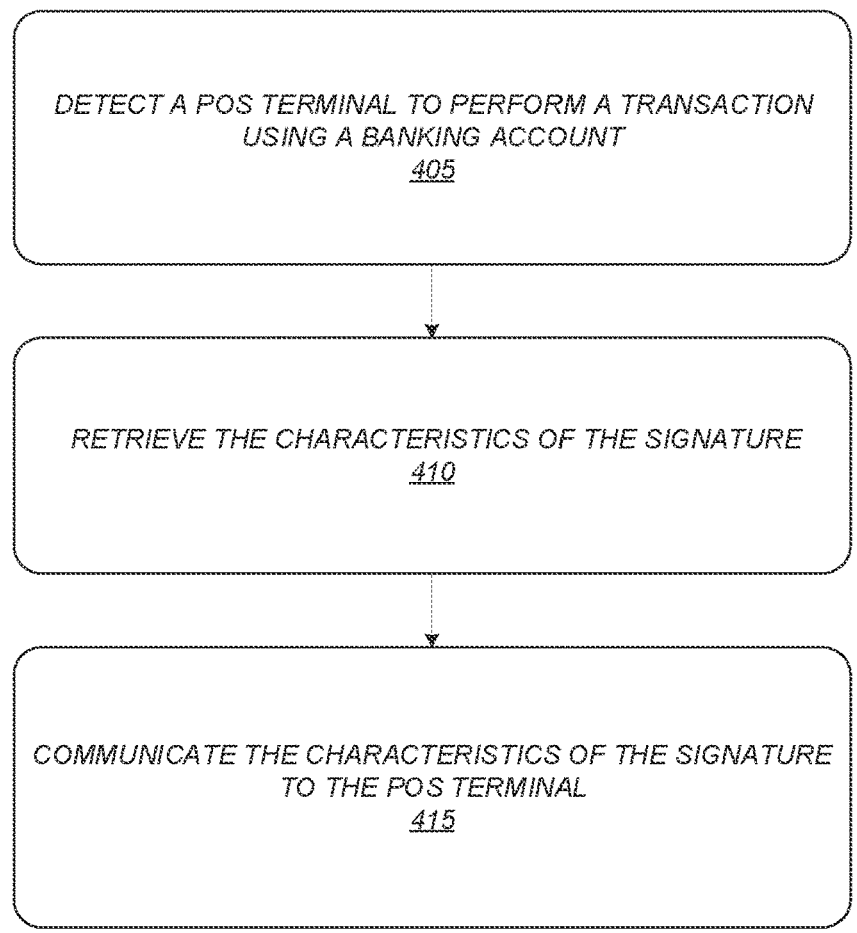
FIG. 4 illustrates an example of a first flow diagram.

FIG. 4 illustrates an example of a logic flow 400 that may be representative of some or all the operations executed by one or more embodiments described herein. For example, the logic flow 400 may illustrate operations performed by a transaction card to perform a transaction with a POS terminal.

At block 405, the logic flow 400 includes detecting a POS terminal to perform a transaction using a banking account. In embodiments, the detection may be based on a protocol used for communication. For example, the transaction card and POS terminal may be established a connection utilizing the EMV protocol when the transaction card is inserted into a slot of the POS terminal and a contact pad of the transaction card couples with a contact pad of the POS terminal. The transaction card and POS terminal may exchange signals to establish a connection. For example, the POS terminal may send one or more signals in accordance with the EMV protocol to the transaction card to establish the connection. In another example, the transaction card and POS terminal may establish a connection via the NFC protocol. In a similar manner, the POS terminal may emit one or more RF signals in accordance with the NFC protocol that may energize circuitry in the transaction card to establish a connection.

At block 410, the transaction card may retrieve, from memory, characteristics of a signature. More specifically, the transaction card may receive one or more signals from the POS terminal requesting data including the characteristics of a customer's signature. The transaction card may determine one or more locations in memory of the stored characteristics and retrieve them from the locations. In one example, the transaction card may put the characteristics in another memory location, such as a buffer or cache, to prepare the characteristics to communicate the characteristics to the POS terminal. As previously discussed, the transaction card may perform one or more operations on the characteristics prior to sending them to the POS terminal, e.g., generating a hash value with or without a salt value, encrypt the characteristics, prepare the data into packets or APDUs in accordance with the communication protocol, etc.

At block 415, the logic flow 400 includes communicating the characteristics of the signature to the POS terminal. In embodiments, the transaction card may communicate the characteristics along with other data to the POS terminal based on the protocol used to establish the connection. For example, the transaction card may communicate the characteristic via one or more electrical signals in accordance with the EMV protocol. In another example, the transaction may communicate characteristics via one or more RF wireless signals in accordance with the NFC protocol. Embodiments are not limited in this manner.

Figure 5:
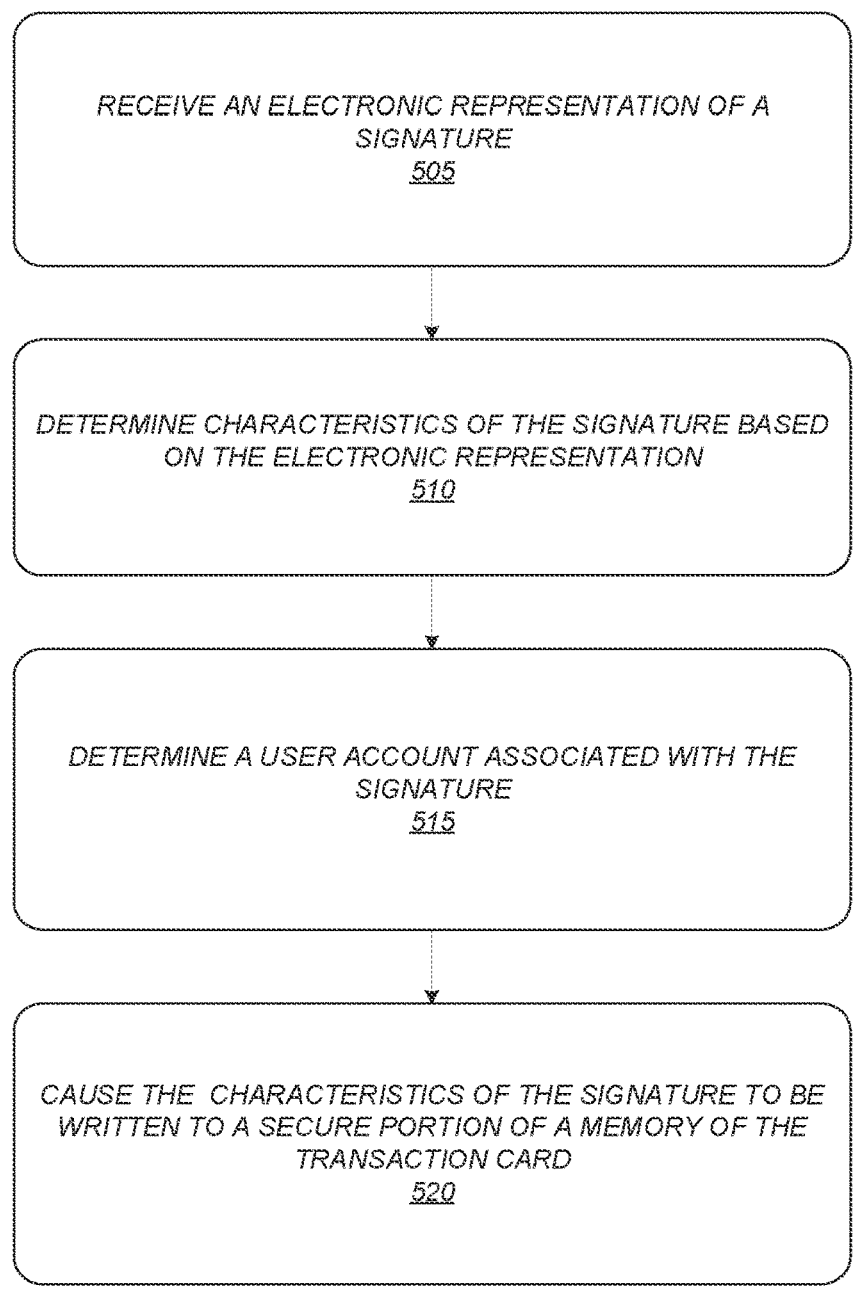
FIG. 5 illustrates an example of a second flow diagram.

FIG. 5 illustrates an example of a logic flow 500 that may be representative of some or all the operations executed by one or more embodiments described herein. For example, the logic flow 500 may illustrate operations performed by a banking system to enable a transaction card to perform transactions.

At block 505, the logic flow 500 includes receiving an electronic representation of a signature. For example, a server of a banking system may receive an application or request for a new or replacement transaction card including customer information and an electronic representation of a signature of the customer. As previously discussed, the electronic representation may be any format, e.g., an image format, a fingerprint format, and so forth. Moreover, the signature may be a handwritten signature and/or a fingerprint signature and the format may be based on the type of signature. Further, the electronic representation may be captured by any number of capturing devices, such as a signature pad, a copy machine, touchpad interface, a touchscreen interface, a fingerprint sensor, and so forth.

At block 510, the logic flow 500 includes determining characteristics of the signature based on the electronic representation. As mentioned, the banking system may apply one or more algorithms to reduce the set of data points of the electronic representation to generate characteristics including the reduced set of data points.

At block 515, logic flow 500 includes determining a user account associated with the signature. For example, the banking system may determine a credit card account, a checking account, a savings account, etc. associated with the customer from which money and/or credit may be drawn from when performing transactions. In addition, the banking system.

At block 520, the logic flow 500 includes causing the characteristics of the signature to be written to a secure portion of a memory of a transaction card. In embodiments, the banking system may perform a write to the memory during an initiation routine performed to configure the transaction card and the memory may be write-once memory that is permanently configured with the characteristics and other customer data relating to the user account, e.g., account number, customer name and/or identifier, card expiration date, CVV, etc. In other instances, the memory may be re-writable memory and characteristics and/or data may be updated.

Further, in some instances, the characteristics and data may be written to the memory of the transaction card in accordance with a protocol, such as EMV protocol or NFC protocol. In other instances, a proprietary protocol may be used to write the data to the memory. Embodiments are not limited in this manner.

FIG. 6 illustrates an example of a logic flow 600 that may be representative of some or all the operations executed by one or more embodiments described herein. For example, the logic flow 600 may illustrate operations performed by a POS terminal to perform a transaction with a transaction card.

At block 605, the logic flow 600 includes detecting a transaction card coupled with an interface to perform a transaction. For example, a POS terminal may establish a connection with the transaction card via an interface, e.g., an NFC interface, an EMV interface, etc. In embodiments, the POS terminal may establish a connection with the transaction via a protocol, such as the EMV protocol, NFC protocol, and so forth.

At block 610, the logic flow 600 includes receiving a first set of characteristics of a signature from the transaction card. More specifically, the POS terminal may receive the characteristics of the signature via the connection between the POS terminal and the transaction card. Further and at block 615, the logic flow 600 includes receiving a signature entry to perform validation for the transaction. For example, the POS terminal may be coupled with a signature input device, such as a handwriting signature pad or a fingerprint sensor, and may receive the signature entry of based on a customer's input. The signature entry may be received as an electronic representation of the customer's signature entered into the input device.

At block 620, the logic flow 600 includes determining a second set characteristics of a signature received from the signature input device. For example, The POS terminal may apply one or more algorithms to the electronic representation of the signature to determine the characteristics. In some instances, the algorithm(s) applied may be the algorithms applied to characteristics stored on the transaction card.

At block 625, the logic flow 600 includes validating the transaction based on the first set of characteristics matching the second set of characteristics, and causing performance of the transaction. For example, POS terminal may compare the first set with the second set and determine that they match. If they match, the POS terminal may permit the transaction. If they do not match, the POS terminal may prevent the transaction. In some instances, only a subset of the characteristics may need to match for the POS terminal to validate the transaction to account variation in a customer's signature. For example, 90% of the characteristics need to match. Embodiments are not limited to this example.

Figure 7:
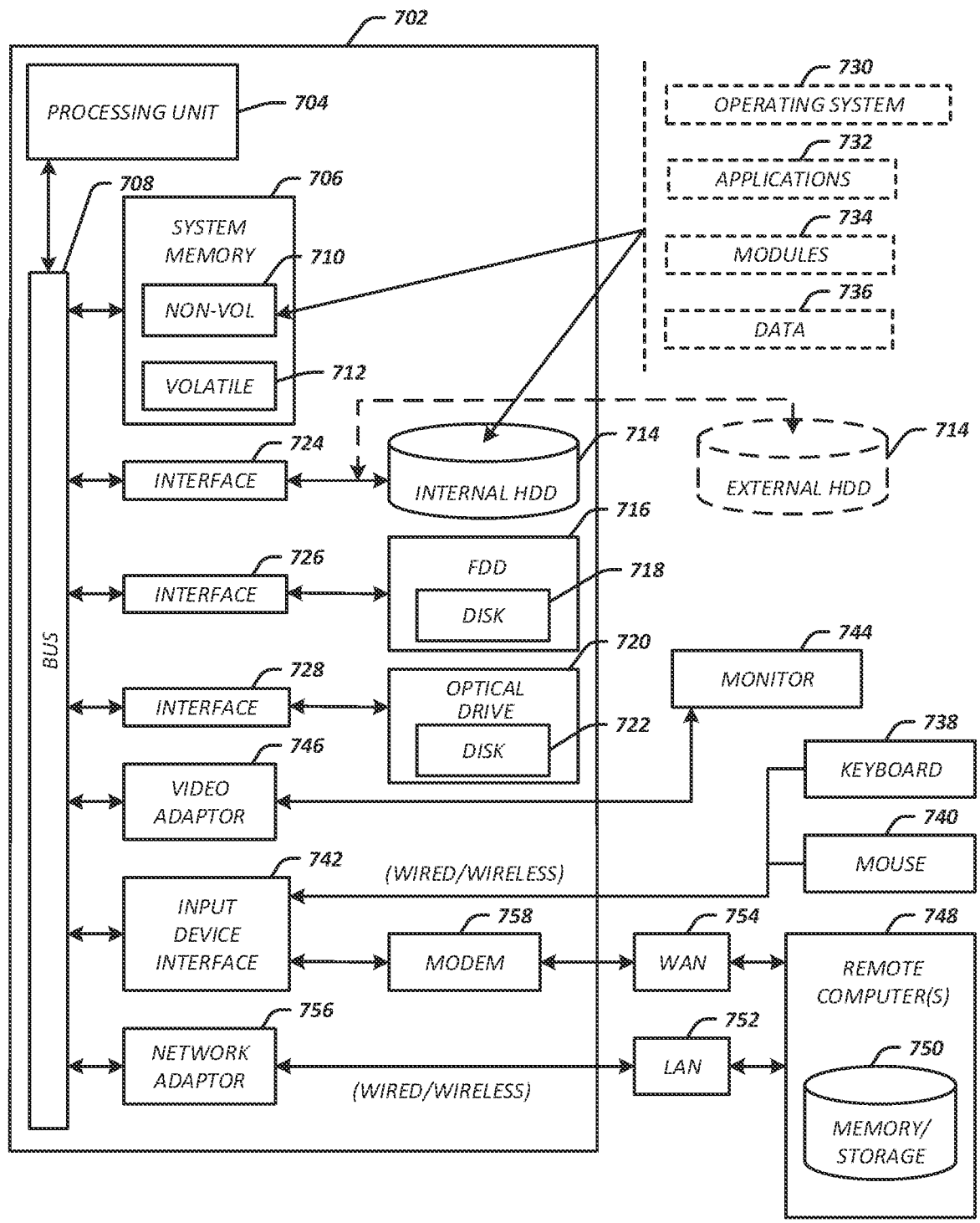
FIG. 7 illustrates an example of a computing architecture.

FIG. 7 illustrates an embodiment of an exemplary computing architecture 700 suitable for implementing various embodiments as previously described. In one embodiment, the computing architecture 700 may include or be implemented as part of system 100.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 700.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 757.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 702.3-related media and functions).

The various elements of the devices as previously described with reference to FIGS. 1A-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

What is claimed is:

1. A computer-implemented method, comprising:
   collecting, from one or more point-of-sale systems, a plurality of instances of a signature associated with a previous transaction card of a banking account during previous transactions performed at the one or more point-of-sale systems with the previous transaction card;
   storing the plurality of instances of the signature in a data store, each of the plurality of instances of the signature stored over a period of time and the previous transaction card having characteristics stored thereon corresponding to the signature;
   receiving a request for a replacement transaction card to replace the transaction card for the banking account;
   applying a machine-learning algorithm to the plurality of instances of the signature in the data store to generate updated characteristics based on each instance of the signature, wherein the updated characteristics are updates for the characteristics on the previous transaction card associated with the banking account, wherein the signature is a handwritten signature and the updated characteristics include a reduced number of data points comprising locations of points of letters of the signature, spacing between the letters of the signature, spacing of the letters of the signature, a capture time of the signature, a pressure applied to capture of the signature, a degree of inclination of a writing instrument to capture the signature, or a combination thereof; and
   causing the updated characteristics of the signature to be written to a secure portion of a memory of the replacement transaction card.

2. The computer-implemented method of claim 1, comprising receiving the request for the replacement transaction card from a mobile application executing on a mobile device or from a point-of-sale device.

3. The computer-implemented method of claim 1, wherein the signature is a fingerprint signature and the updated characteristics comprise patterns of the fingerprint signature, minutiae features of the fingerprint signature, moisture content of finger, pressure applied to capture fingerprint signature, or a combination thereof.

4. The computer-implemented method of claim 1, comprising:
   determining a personal identification number (PIN) associated with the banking account, an account number associated with the banking account, an expiration date, and a card verification value (CVV); and
   cause, during the initiation routine of the replacement transaction card, the PIN, the account number, the expiration date, and the CVV to be written to a secure portion of the memory.

5. The computer-implemented method of claim 1, comprising issuing the replacement transaction card with the updated characteristics to a user associated with the banking account.

6. A computing apparatus comprising:
   a processor; and
   a memory storing instructions that, when executed by the processor, cause the processor to:
   collect, from one or more point-of-sale systems, a plurality of instances of a signature associated with a previous transaction card of a banking account during previous transactions performed at the one or more point-of-sale systems with the previous transaction card;
   store the plurality of instances of the signature in a data store, each of the plurality of instances of the signature stored over a period of time and the previous transaction card having characteristics stored thereon corresponding to the signature;
   receive a request for a replacement transaction card to replace the transaction card for the banking account;
   apply a machine-learning algorithm to the plurality of instances of the signature in the data store to generate updated characteristics based on each instance of the signature, wherein the updated characteristics are updates for the characteristics on the previous transaction card associated with the banking account, wherein the signature is a handwritten signature and the updated characteristics include a reduced number of data points comprising locations of points of letters of the signature, space between the letters of the signature, spacing of the letters of the signature, a capture time of the signature, a pressure applied to capture of the signature, a degree of inclination of a writing instrument to capture the signature, or a combination thereof; and
   cause the updated characteristics of the signature to be written to a secure portion of a memory of the replacement transaction card.

7. The computing apparatus of claim 6, comprising the processor to receive the request for the replacement transaction card from a mobile application executing on a mobile device or from a point-of-sale device.

8. The computing apparatus of claim 6, wherein the signature is a fingerprint signature and the updated characteristics comprise patterns of the fingerprint signature, minutiae features of the fingerprint signature, moisture content of finger, pressure applied to capture fingerprint signature, or a combination thereof.

9. The computing apparatus of claim 6, wherein the processor to:
   determine a personal identification number (PIN) associated with the banking account, an account number associated with the banking account, an expiration date, and a card verification value (CVV); and
   cause, during the initiation routine of the replacement transaction card, the PIN, the account number, the expiration date, and the CVV to be written to a secure portion of the memory.

10. The computing apparatus of claim 6, comprising the processor to issue the replacement transaction card with the updated characteristics to a user associated with the banking account.

11. A non-transitory computer-readable storage medium, the computer-readable storage medium including instructions that when executed by a processor, cause the processor to:
- collect, from one or more point-of-sale systems, a plurality of instances of a signature associated with a previous transaction card of a banking account during previous transactions performed at the one or more point-of-sale systems with the previous transaction card;
- store the plurality of instances of the signature in a data store, each of the plurality of instances of the signature stored over a period of time and the previous transaction card having characteristics stored thereon corresponding to the signature;
- receive a request for a replacement transaction card to replace the transaction card for the banking account;
- apply a machine-learning algorithm to the plurality of instances of the signature in the data store to generate updated characteristics based on each instance of the signature, wherein the updated characteristics are updates for the characteristics on the previous transaction card associated with the banking account; and
- cause the updated characteristics of the signature to be written to a secure portion of a memory of the replacement transaction card, wherein the signature is a hand-written signature and the updated characteristics include a reduced number of data points comprising locations of points of letters of the signature, space between the letters of the signature, spacing of the letters of the signature, a capture time of the signature, a pressure applied to capture of the signature, a degree of inclination of a writing instrument to capture the signature, or a combination thereof.

12. The computer-readable storage medium of claim 11, comprising the processor to receive the request for the replacement transaction card from a mobile application executing on a mobile device or from a point-of-sale device.

13. The computer-readable storage medium of claim 11, comprising the processor to cause issuance the replacement transaction card with the updated characteristics to a user associated with the banking account.

* * * * *